Dec. 10, 1935. G. F. BRENDEL 2,023,572
METHOD FOR EFFECTING BY PRESSURE THE FACE
GRINDING OF HARD MATERIAL SURFACES
Filed Dec. 14, 1933
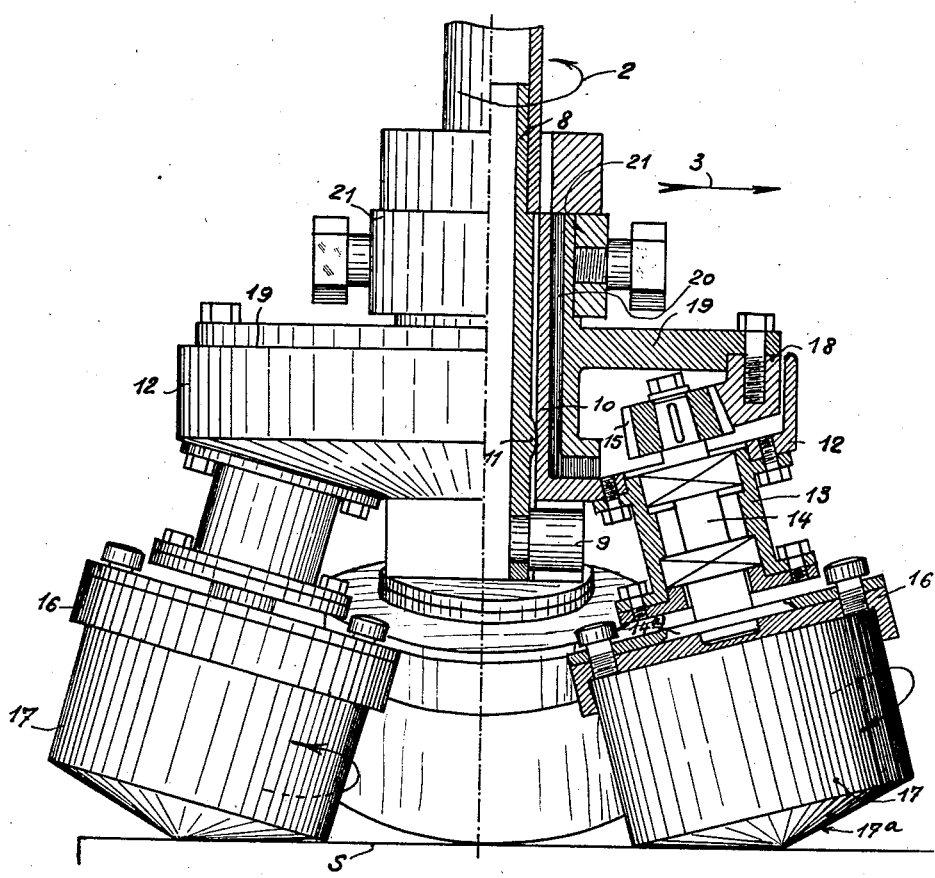
INVENTOR
GEORGES F. BRENDEL
BY
ATTORNEYS

UNITED STATES PATENT OFFICE 2,023,572

METHOD FOR EFFECTING BY PRESSURE THE FACE GRINDING OF HARD MATERIAL SURFACES

Georges Fernand Brendel, Paris, France, assignor to Societe Anonyme dite: Societe Marbriere de Paris, Paris, France Application December 14, 1933, Serial No. 702,283
In France December 22, 1932

2 Claims. (Cl. 51—120)

This invention relates to a method and a machine designed to be used for effecting by pressure surface grinding of hard material such as marble, hard granite, glass, steel, etc.

Said method consists substantially in attacking the material by means of one or a plurality of grinding wheels each working tangentially to the surface along a line of contact which turns around a point moving in parallel with the surface of the work.

Consequently, the machine is characterized by one or a plurality of grinding wheels rotating around their axes which are drawn along in a revolving motion by means of a rotary shaft perpendicular to the surface to be faced and which effects a translatory movement in parallel with said surface.

The revolution of the grinding wheel could be produced by re-action of the surface upon said wheels but it will be advantageously mechanically controlled by the re-action of a gear which has no rotary motion and is concentric to the movable rotary shaft mounted upon pinions integral with the grinding wheels, so that the direction in which the latter rotate is favourable to producing the greatest possible output.

The machine may comprise grinding wheels having a cylindrical working surface mounted upon axes in parallel with the surface to be operated upon but it may also comprise grinding wheels having a conical working surface tangential to the surface to be faced, the cone axis constituting the axis of rotation.

In order that the invention may be fully appreciated the same will now be described with reference to the accompanying drawing which illustrates by way of example, a mode of execution in which the operating surface of the grinding wheels is of conical shape.

In the more of execution shown in the drawing, the tubular rotary shaft 8 normal to the surface S drives rotatively by the intermediary of pins 9 and of a sleeve 10 in which said shaft is mounted with a socket joint at 11. The sleeve 10 is formed integrally with a web 12 which carries bearings 13, four for example, the oblique axes of which converge towards the same point of the axis of shaft 8. Shafts 14 which carry a keyed pinion 15 at their upper ends are mounted and supported in said bearings. Said shafts 14 each carry at their lower end the casing 16 of a grinding cylinder 17 whose lower operating surface is a conical surface 17ª which is tangential along a generatrix to the surface S.

The casings 16 and their grinding cylinders 17 are each movable as a unit relatively to a plate 14ª on shaft 14 upon which said casing is mounted by means of a bayonet coupling.

The bevel pinions 15 gear with an inner toothed circular gear 18 mounted upon a plate 19 integral with a sleeve 20 which is concentric with the sleeve 10 and the shaft 8. The sleeve 20 is locked in a ring 21 which is connected by any suitable means capable of preventing its rotation with the carriage that supports the shaft 8. Said carriage has been represented here as effecting a translatory motion in parallel with the surface S.

It will be easily seen that the rotation of shaft 8 producing that of the system 10—12 also causes the grinding cylinder 17 to revolve around said shaft and that the re-action of the stationary circular gear 18 causes the pinions 15 to rotate upon themselves, that is to say causes the rotation of the grinding cylinders with their shafts.

Considering moreover that the carriage which supports the shaft 8 moves in parallel with the surface S the generatrix of the grinding cylinders which are in contact with said surface sweep its whole area in the same manner as previously.

It will be noted that in all cases the rotary motion of the pinions 6 and 15 is such that for a spectator placed at the center of the system and looking at a grinding wheel, the direction of the rotary motion is the reverse of that of the revolving motion.

It will be understood that while I have illustrated the preferred form of construction for carrying my invention into effect, it is capable of variation and modification without departing from the spirit of the invention. I therefore do not wish to be limited to the precise details of construction set forth but desire to avail myself of such variations and modifications as come within the scope of the appended claims and more particularly those modifications resulting from the substitution of certain mechanisms by others capable of producing the same movements such as the substitution of friction driving means to the described toothed gears.

What I claim and desire to secure by Letters Patent of the United States is:

1. A machine for grinding surfaces of articles consisting of hard materials, said machine comprising a main rotary shaft adapted to extend perpendicularly to the surface to be ground, a plurality of auxiliary shafts extending obliquely in relation to the main shaft, means connecting the main shaft with the auxiliary shafts for rotating the auxiliary shafts along with the main shaft, means connected with the auxiliary shafts for rotating the auxiliary shafts around their axes, a plurality of grinding cylinders, each one of said grinding cylinders being firmly mounted upon a separate auxiliary shaft, each of said grinding cylinders comprising at one of its ends a conical surface which is adapted to come in contact with the surface to be treated along the line of a tangent to said conical surface.

2. A machine for grinding surfaces of articles consisting of hard materials, said machine comprising a main rotary shaft adapted to extend perpendicularly to the surface to be ground, a plurality of auxiliary shafts extending obliquely in relation to the main shaft, a sleeve operatively connected with said main shaft, means connecting said sleeve with the auxiliary shafts for rotating the auxiliary shafts along with the main shaft, a gear meshing with the auxiliary shafts for rotating the same around their axes, a plurality of grinding cylinders, each one of said grinding cylinders being firmly mounted upon a separate auxiliary shaft and being rotatable therewith, each of said grinding cylinders comprising at one of its ends a conical surface which is adapted to come in contact with the surface to be treated along the line of a tangent to said conical surface.

GEORGES FERNAND BRENDEL.